United States Patent [19]

Stroppiana

[11] Patent Number: 5,279,465
[45] Date of Patent: Jan. 18, 1994

[54] METHOD AND A SYSTEM FOR RECYCLING WASTE MATERIALS INCLUDING PLASTIC MATERIALS

[76] Inventor: Fernando Stroppiana, Via Alba-Narzole 7, 12055 Diano D'Alba (Cuneo), Italy

[21] Appl. No.: 927,620

[22] Filed: Aug. 10, 1992

[30] Foreign Application Priority Data

Aug. 12, 1991 [IT] Italy .................. TO91A000646

[51] Int. Cl.$^5$ .................................... B02C 19/12
[52] U.S. Cl. .................. 241/29; 241/152.2; 241/DIG. 38
[58] Field of Search .......... 241/29, 3, DIG. 38, 152.2

[56] References Cited

U.S. PATENT DOCUMENTS

| | | | |
|---|---|---|---|
| 2,464,746 | 3/1949 | Gering | 241/3 |
| 2,959,362 | 11/1960 | Smith et al. | 241/3 |
| 3,797,761 | 3/1974 | Neil | 241/34 |
| 4,623,515 | 11/1986 | Frei et al. | 422/1 |
| 5,080,291 | 1/1992 | Bloom | 241/19 |

*Primary Examiner*—Mark Rosenbaum
*Assistant Examiner*—John M. Husar
*Attorney, Agent, or Firm*—Edward D. Manzo; David Lucente

[57] ABSTRACT

A method and system for recycling waste materials enables the treatment of masses of waste including thermosetting plastics materials, high-melting thermoplastics materials, aluminum, wood, paper, fabrics, etc. The mass of waste is first subjected to a grinding process, preferably in two stages, to reduce it to a maximum particle size of the order of 10 mm. The granular material thus produced undergoes a heating and mixing process and is then reduced to sheet or strip form and simultaneously cooled in order to undergo a scraping or shaving process which leads to the formation of a mass substantially comparable to a powder with a particle size of between 50 and 1000 microns, including a certain quantity of fibres. The shavings produced can be mixed with a better-quality plastics material, at least some of which may be produced from fairly large articles made of plastics materials which are first separated from the mass to be treated and ground separately, to produce a recycled plastics material in which the fraction of thermosetting materials, high-melting thermoplastics, aluminum, etc. constitute a filler and a fibrous reinforcing structure.

35 Claims, 1 Drawing Sheet

METHOD AND A SYSTEM FOR RECYCLING WASTE MATERIALS INCLUDING PLASTIC MATERIALS

The present invention relates in general to the problem of recovering or recycling waste materials including plastics materials.

The problem of recovering raw materials from waste materials such as solid urban refuse and industrial refuse has for some time been at the centre of the attention of all authorities and operators concerned with the protection of the environment and, in general, with the possibility of recovering useful materials which can be re-used profitably from masses of waste materials which are otherwise destined to be collected in dumps (which is difficult and expensive) possibly after at least partial incineration or pyrolysis.

The attention of operators has been concentrated particularly on the possibility of recovering the plastics materials which are present to a considerable extent both in industrial refuse and, above all, in solid urban refuse. For a useful summary of the many solutions proposed for this purpose, reference may be made, for example, to the volume "Recupero postconsumo e riciclo delle materie plastiche" ("The recovery and recycling of plastics materials after use") by Febo Severini and Maria G. Coccia - Edizione IVR.

In particular, at least some of the techniques documented in this summary, for example, that described in European patent EP-B-0 140 846, have satisfactorily solved the problem of treating heterogeneous plastics materials, that is, waste plastics materials (for example, high- and low-density polyethylene, polypropylene, polyvinyl chloride, polystyrene, acrylonitrile-butadiene-styrene, polymethyl methacrylate, polyester, polyamide and acetal resins, as well as polyurethane elastomers) which are derived from various kinds of waste and are normally present in bulk in solid urban refuse and in most industrial refuse.

It seems to be essential to be able to treat heterogeneous mixtures of plastics materials in order to avoid the need for the selective collection of waste plastics materials of a single type or of several very similar types and/or the need to sort them out carefully after collection In fact, in the vast majority of cases such a selection operation is clearly uneconomic when carried out on industrial refuse and, as .regards solid urban refuse, is practically impossible.

In any case, in the solutions proposed up to now, particularly when they are applied to solid urban refuse, it is essential, in order to effect the recovery operation, to sort out, and consequently remove from the mass of waste to be treated, certain materials (thermosetting plastics materials, plastics materials with very high softening points, for example higher than 250° C., wood, paper, rubber, aluminium, fabric, etc.) which are somehow eliminated and, in any case, have to be disposed of as waste which cannot be recovered or reused.

The object of the present invention is to provide means for enabling these materials which, in the methods of the prior art had to be eliminated, to be used for the purposes of the recovery operation.

According to the present invention, this object is achieved by virtue of a method having the characteristics recited in the following claims. A further subject of the invention is a system for carrying-out this method.

Essentially, the present invention is based on the recognition of the fact that materials such as thermosetting plastics materials, thermoplastics materials with high softening points, wood, paper, rubber, aluminium, etc., which are usually present in industrial refuse and, particularly, in solid urban refuse, may to advantage be used, after they have been reduced to small pieces by scraping or shaving, as fillers and fibrous reinforcements for plastics materials within a process for recovering the plastics materials present in such waste in general.

The invention will now be described, purely by way of non-limiting example, with reference to the appended drawings, in which:

FIG. 1 shows, as a whole, the structure of a system for recovering and recycling industrial refuse or solid urban refuse which operates according to the invention.

Figure 1:
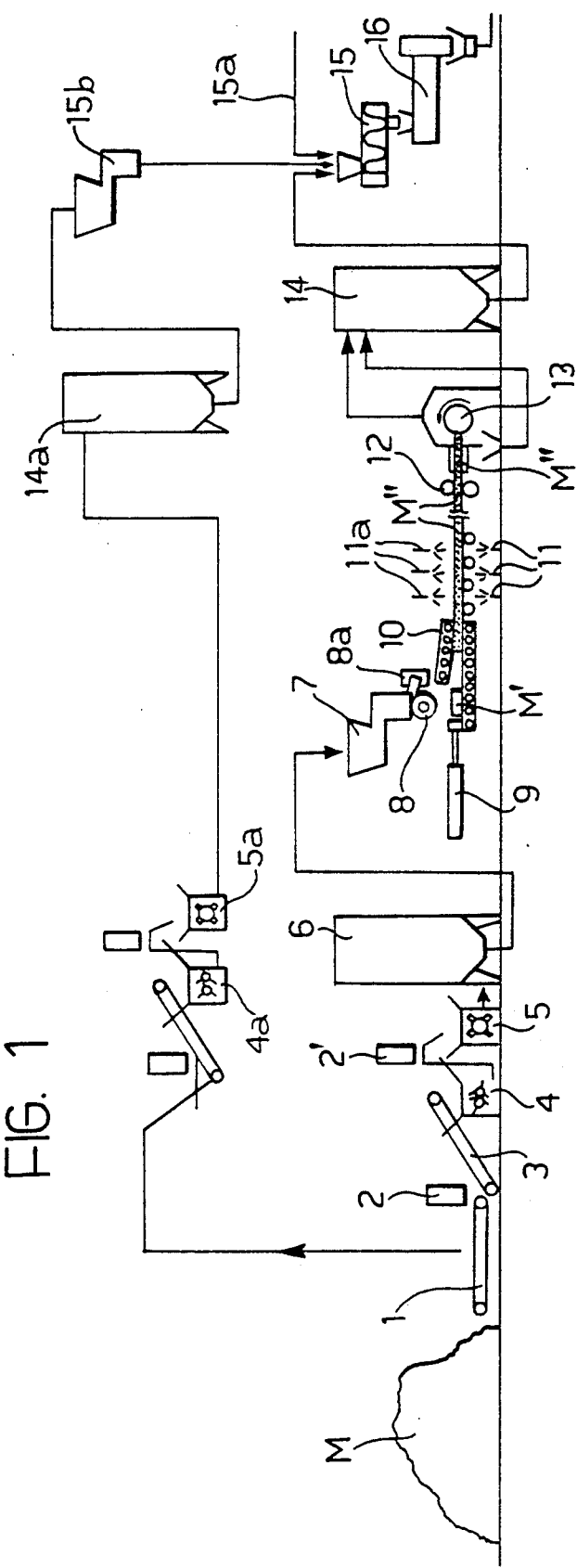
FIG. 1 shows schematically the structure of a system for putting the invention into practice.

In practice, the system is intended to be supplied with a mass of waste material M which, for simplicity, will be assumed to be constituted by a mass of solid urban refuse resulting from the differentiated collection of various kinds of waste.

The composition of the waste M is not absolutely uniform since it may vary, even to a quite considerable extent, in dependence on particular local customs, on the type of usage, and on consumption trends.

During the preliminary step of the method of the invention, the waste material M is sent onto a separator belt 1 to undergo a separation step, the object of which is essentially to remove from the mass which is to be sent towards the main branch of the system materials (more correctly, one should say articles) such as large motor-vehicle parts, items of furniture, domestic electrical appliances, etc. which are quite often found in differentiated solid urban refuse as a result of inappropriate disposal. In any case, these are actual articles, the presence of which does not exclude the possibility of their being recovered in different ways; for example, this is the case with large articles made of plastics materials which can usefully be processed (according to the criteria which will be described further below) to produce "good-quality" plastics material for mixing with the shavings or scrapings produced in the main branch of the system.

The material which remains on the belt 1 after this initial rough sorting step (material which may also correspond to the material supplied to the plant by the bodies which collect solid urban refuse) is intended to be sent to a first step in which it is broken up.

Before it is sent for this process, however, the material is passed in front of a unit 2 of known type for removing metals (typically by a magnetic action), the function of which is essentially to indicate the presence of large metallic or ferrous-metal bodies which could cause damage during the processing cycles further downstream so that such bodies can be removed, also automatically.

The material which passes the unit 2 for removing metals is sent to a further conveyor 3 (typically a belt conveyor) which supplies a first grinding unit 4, the function of which is to break up the material coming from the belt 3 to effect a first dimensional regularisation of the material to be treated.

Typically, the device 4 is constituted by a grinder which operates at a slow speed and may, to advantage, be constituted by a geared grinder of the type with a worm screw and a helical gear with two or more shafts which contrarotate at different speeds and on each of which a respective group of grinders is mounted which intersects a group of grinders carried by another shaft.

Grinding devices of the type specified above are available, for example, as model G5 and G10 grinders from Sant'Andrea Novara S.p.A., of Novara (Italy).

As stated, the role of the grinder 4 is essentially to break up coarsely the material to be treated by breaking the largest items, for example, containers or tanks of medium-large dimensions (10–50 and 100 liters), pallets and articles of various large dimensions to form bulk pieces having minimum dimensions of the order of 4–5 cm.

The material resulting from this breaking-up operation is passed in front of a further unit 2' for removing metals, the function of which is essentially to detect the presence of any remaining metal bodies of a certain size so as to be able to stop the operation of the system (at least in the downstream portions) to remove such metal bodies, preventing the risk of damage to the system.

Downstream of the grinder 4 and the unit 2' for removing metals is a further grinding unit 5 constituted essentially by a fast blade mill.

For example, this may be a mill or granulator of the type currently used to granulate plastics materials and derivatives for other production processes. These are usually mills with central rotors of the TRIAL type which further break up the material coming from the grinder 4 to produce a uniform granular mass with a maximum individual particle size of the order of 10 mm.

Mills suitable for carrying out this operation are currently available as Series M, Series L, Series P, and Series GP mills from the company Previero of Alzate Brianza (Como) - Italy.

The material resulting from the grinding achieved by the mill 5 may be sent directly to the further steps of the process or, according to a solution which has been found preferable as regards the general economy of the running of the system, stored, for example, in storage silos 6. This selection is preferable since it enables a reserve to be formed between the portion of the system situated upstream of the silos 6 (which is intended primarily to operate on batches of material M) and the portion of the plant situated downstream (which is intended, in principle, to operate with a generally continuous cycle with a constant speed of advance).

The material taken from the silos 6 (or, alternatively, the material coming from the mill 5) is sent to a heat processing unit, the function of which is essentially to cause an initial softening of the thermoplastics materials included in the material M.

This is achieved by the transfer of the material into a collecting tank 7, the output of which supplies an extruder 8.

This is generally an extruder currently in production, of the type used for compounding plastics materials. Extruders of this type are available from and produced by, for example, Bausano & Figli S.p.A., of Rivarolo Canavese (Turin)—Italy, or Icma—San Giorgio, S.p.A., of San Giorgio Su Legnano (Milan)—Italy.

In the extruder 8, the granulated material is mixed and brought to the softening point (for example, about 150°–200° C.) without forced mixing, the operation of the extruder and, in particular, of its screw or screws, being regulated, however, so as simply to achieve a transporting action, so that the heterogeneous product is heated and compacted but mechanical and/or heat stresses and the degradation of the heat-sensitive products are avoided.

It will be appreciated that in the schematic view of FIG. 1, the extruder 8 is shown end-on with the axis of its screw oriented in a plane perpendicular to the plane of the drawing. In general, the function of the extruder 8 is to form, at its output, an extruded strip or band having dimensions, for example, of the order of 30×100 mm cross-section. This strip is cut by a blade unit 8a (for example, a guillotine or a cutting unit with rotary blades), the function of which is to form short pieces for loading into an underlying compactor unit 10.

This compactor unit, into which the intermediate material (shown in the drawing in the form of pieces M' produced from the strip or band formed by the extruder 8) is loaded by means of a pusher 9 operated by a jack, may be compared to a kind of static die or extruder for forming, from the pieces M', sheets of extruded material which are subjected, in a conveyor unit 11 situated downstream (typically a conveyor unit with rollers) to the cooling action of water jets 11a, the function of which is essentially to reduce the temperature of the material to about 50° from the level of 150°–200° C. at which it emerges from the extruder 8.

Naturally, the same function also could be carried out by different elements, for example, by a calender constituted by a pair of contrarotating cylinders or rollers, to produce a sheet of the desired dimensions.

In general, the sheet produced as a further intermediate product (indicated M″ in the drawings) has a rough appearance since is is constituted by a matrix of thermoplastics materials which have been softened in the extruder 8, in which is suspended a continuous granular mass constituted by all the materials (for example, thermosetting plastics materials, high-melting thermoplastics materials, aluminium, etc.) which, whilst they have been broken up by the devices 4 and 5, have passed through the extruder 8 practically unchanged.

In general, the dimensions of the cooling unit 11a are such as to satisfy two requirements.

In the first place, it is desirable for the material M″ to remain in the cooling unit 11a long enough for its temperature to be reduced to a level of the order of 50° C.

In the second place, the tunnel 11 also preferably forms a kind of reserve which enables the unit constituted by the extruder 8 and the die 10 to operate independently—at least as regards its medium and long-term behaviour—of the downstream processing unit constituted, for example, by a drawing calender 12 which supplies the sheet material M″ to a shaver or scraper device 13 which constitutes the heart of the system.

The function of the device 13 is essentially to subject the sheet material 12 to a shaving or scraping action, to produce from the sheet M″ a new granulated mass composed essentially of granules and fibres of small particle size, in the manner which will be described further below.

The scraper unit 12 thus bears a certain similarity (except for its speed of movement) to the so-called crushers used in the hygiene-sanitary products industry for producing, from sheets of fibrous cellulose, the mass of microfibres currently defined as aerofelt or fluff for use in producing the absorbent pads of such products.

Different solutions may therefore be used for forming the shaver device 13.

Figure 2:
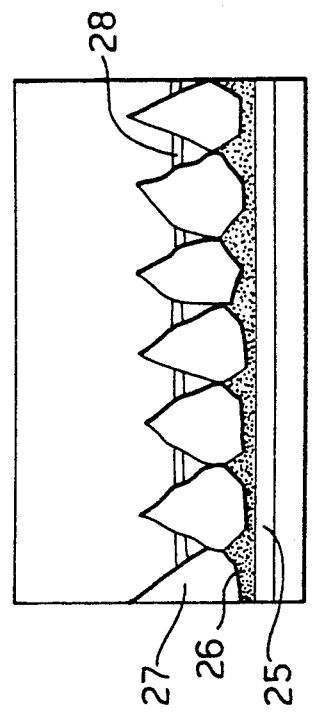
FIG. 2 shows in detail the structure of a scraper or shaver element to be used for putting the invention into practice.

For example, the shaver device may be produced in the form of a rotary roller, the outer surface of which has a covering of abrasive material with a surface structure of the type shown in FIG. 2, in which the support for the abrasive material (in practice, the surface of the rotary roller or a substrate fabric or strip fixed thereto) is indicated 25, a continuous aggregate of abrasive granules 27 being applied thereto with the interposition of a first layer of glue 26 and being fixed firmly to the substrate by a further layer of glue 28 which seals off the lower portions of the granules, leaving their head portions free.

The use of abrasive strips sold by the company Ekamant of Markaryd has been found to be particularly advantageous for putting the invention into practice. In these strips, the abrasive material is constituted by aluminium oxide or silicon carbide with the use of adhesive resins, particularly phenolic resins, as the glue.

Alternatively, instead of being mounted on the surface of a rotary cylinder or roller, the abrasive strip may be in the form of an endless strip passing around two rollers, at least one of which is driven.

As a further alternative, the shaver or scraper element may be in the form of a mill over which the sheet material M" coming from the calender 12 is intended to pass.

As a further alternative, the shaver element could be constituted by a mill or another device (possibly with reciprocating motion) covered with corundum or a material containing diamonds.

Whichever particular solution is adopted, the function of the scraper device is essentially to break down and pulverise the sheet material M" (which is constituted by both thermoplastics materials which have been softened in the extruder 8 and granules, flakes, etc. of materials which are unaffected by such treatment), reducing it to a powder which has a particle size variable from 50 microns to about 1000 microns and includes a certain quantity of fibres having transverse dimensions of from 100 microns to 400 microns and lengths varying from 1 to 6 mm.

It has been found that, in order to achieve a wholly satisfactory result, it is preferable for the speed of movement of the shaver element 13 (that is, in practice, the speed at which the shaving elements—for example, the granules 27 of FIG. 2—move relative to the sheet M") to be quite slow, for example, of the order of one meter per minute.

This prevents the development of undesirable heat due to friction.

It can thus be seen that the shaving or scraping action in the method of the invention is carried out substantially cold.

As stated, as a result of the scraping or shaving, all the materials which were previously inert and unaffected by the softening action, such as the high-melting thermoplastic materials, the thermosetting materials, the rubber, the wood, the aluminium, the paper, the card, the fabrics, present in the waste materials M are reduced to a powdered mass with particles of various shapes and sizes, that is, to an aggregate which, in spite of its intrinsically non-homogeneous nature, has been found surprisingly suitable for use as a reinforcing structure for a mass of thermoplastics material. This material is therefore very suitable for use as a filler and, from this point of view, is thus preferable to conventional mineral fillers both as regards its lower specific weight and because of its intrinsic characteristic that, on average, it has greater physical strength (in fact it should be remembered that this material includes a considerable percentage of fibres).

Naturally, the particle size and the general morphology of the product resulting from the shaving or scraping action may be modified widely by the variation of the characteristics of the shaving or scraping means.

In particular (according to known criteria), the proportion of fibres or microfibres present may be increased in comparison with the rest of the granules which are substantially comparable to a powder, or the shaving action may even be arranged so as to form actual chips such as those resulting from machining operations.

The material produced by the scraping or shaving action may be collected in a silo 14 or another storage device in order to be mixed in larger or smaller proportions with other plastics materials, which may generally be defined as "better-quality" materials, in a mixer 15.

In particular, the better-quality plastics material may be constituted either by material originating outside the system, supplied to the mixer 15 on an input line 15*a* (in this case this could be either virgin plastics material, or recovered plastics material from other sources) or, according to a particularly advantageous solution, by plastics material produced in a secondary line of the system.

This line is supplied with the large articles which are removed from the mass M of waste processed on the separator belt 1 and are then sent to be broken down by a grinding unit 4*a* and a mill 5*a* substantially comparable to the grinder 4 and the mill 5 described above and then stored in a silo 14*a* for supply to the mixer 15 on a line 15*b*.

Naturally, one could certainly consider operating both the line 15*a* and the line 15*b* simultaneously so as to supply the mixer 15 with both good-quality plastics material of external origin (15*a*), and with good-quality plastics material originating within the system (line 15*b*) as well as with the material produced by the scraping or shaving operation. Naturally, the relative proportions of the flows of the three components may be varied selectively within a wide range of values in dependence on the specific requirements of use.

The product of the shaving or scraping operation is thus compounded or mixed with the better-quality plastics material in the mixer 15. The relative proportions will depend—as stated—on the characteristics to be imparted to the final products.

If a product with good characteristics is desired, a quite considerable quantity of good quality-material will be added to the micronised filler coming from the shaving or scraping operation. For example, if considerable resilience is required, powders resulting from the grinding of tires or resilient materials may be added.

In any case, it will be appreciated that the scraping or shaving is such as to reduce the particle sizes of the components which cannot give rise to the formation of fibres to a minimum, so that these non-fibrous components can give rise to a mineral filler which is nevertheless useful in the final material produced and, in any case—precisely because of their small particle size—are not such as to trigger fractures in the final product.

The mixture produced in the mixer 15 is preferably discharged in a continuous flow into an underlying extruder, indicated 16, which has a die with a granulating head so as to produce a granular product which can be cooled and then stored ready for use in a moulding line or bagged and sold to external users.

Naturally, the material output by the extruder 16 may undergo any cube-, thread-, or granule-forming process or may be moulded directly.

A great variety of final products which, in any case, have good mechanical strength characteristics is thus produced.

In any case, the material produced according to the invention has been found very suitable for producing containers such as bins and the like for collecting solid urban refuse and for producing sub-floor slabs and other building products, as well as for producing components such as pallets and containers for the transportation of various goods.

Naturally, the principle of the invention remaining the same, the details of construction and forms of embodiment may be varied widely with respect to those described and illustrated, without thereby departing from the scope of the present invention.

What is claimed is:

1. A method of recycling a mass of waste materials including a first fraction of thermofusible plastics materials and a second fraction of materials which are substantially unaffected by thermofusion processes, comprising the steps of:
   subjecting the mass of waste materials to a grinding process to produce a mass of granular material therefrom,
   subjecting the mass of granular material to a compacting process to produce bodies having properties of mechanical cohesion, and
   subjecting the bodies to a shaving process to give rise to a mass of shavings of small particle size in which the second fraction is present in the form of a fine powder and/or fibers, the mass of shavings being usable as a filler for addition to plastics materials.

2. A method according to claim 1, wherein the second fraction includes materials selected from the group constituted by: thermosetting plastics materials, high-melting plastics materials, metals, wood, paper, fabrics and mixtures thereof.

3. A method according to claim 1, wherein the compacting process is carried out by the heating of the granular material to soften the first fraction.

4. A method according to claim 3, wherein the bodies with properties of mechanical cohesion are cooled after the compacting process.

5. A method according to claim 4, wherein the cooling is carried out until the cooled bodies reach a temperature of the order of 50° C.

6. A method according to claim 1, wherein the grinding process reduces the first fraction and the second fraction together to form a granular mass with a maximum particle size of the order of 10 mm.

7. A method according to claim 1, wherein the grinding process includes at least two successive steps.

8. A method according to claim 7, wherein it includes the step of checking for the presence of large metallic residues in the processed mass between the two successive steps, in order to stop the process if residues capable of causing damage are present.

9. A method according to claim 7, wherein the first step of the grinding process breaks the first and second fractions down to a mass including pieces having dimensions of the order of 4–5 cm.

10. A method according to claim 7, wherein the first step of the grinding process is carried out by a breaker device with circular rotary blades.

11. A method according to claim 7, wherein the second step of the grinding process is carried out by a mill.

12. A method according to claim 1, wherein the granular material is stored, at least temporarily, after the grinding process.

13. A method according to claim 1, wherein the compacting process is carried out at least partially in an extruder.

14. A method according to claim 1, wherein the compacting process is carried out substantially without the application of appreciable mechanical and/or heat stresses to the mass under treatment.

15. A method according to claim 1, wherein the compacting process is carried out by the heating of the mass of granular material to a temperature of the order of 150°–200° C.

16. A method according to claim 1, wherein the compacting process leads to the formation of bodies in the form of sheets or strips for shaving.

17. A method according to claim 16, wherein the bodies in the form of sheets or strips are formed by a die.

18. A method according to claim 16, wherein the bodies in the form of sheets or strips are formed by a calender.

19. A method according to claim 16, wherein the bodies in the form of sheets or strips are formed under the action of a compacting element with a piston.

20. A method according to claim 16, wherein the material is divided into pieces by a cutting operation before it is reduced to sheets or strips.

21. A method according to claim 1, wherein the shaving process is effected by a body which carries abrasive formations and is moved relative to the bodies with properties of mechanical cohesion.

22. A method according to claim 21, wherein the body is covered with granules of abrasive material.

23. A method according to claim 22, wherein the abrasive material in granules is selected from the group constituted by silicon carbide and silicon oxide.

24. A method according to claim 21, wherein the body with abrasive formations is constituted by a rotary drum.

25. A method according to claim 21, wherein the body is constituted by a mill.

26. A method according to claim 21, wherein the body is constituted by an endless strip.

27. A method according to claim 1, wherein the shaving process forms a mass of shavings constituted by a powder having a particle size substantially of between 50 microns and 1000 microns and including a certain quantity of fibres.

28. A method according to claim 27, wherein the fibres have cross-sectional dimensions substantially of between 100 microns and 400 microns and lengths of between about 1 and 6 mm.

29. A method according to claim 1, wherein the shaving process is intended to form at least some chip-like structures.

30. A method according to claim 1, wherein the mass of shavings is stored temporarily.

31. A method according to claim 1, wherein the mass of shavings is mixed with a plastics material for compounding.

32. A method according to claim 31, wherein at least some of the plastics material comes from an external source.

33. A method according to claim 1 including the steps of:

separating the components of plastics material of considerable size from the mass before the grinding process, and subjecting them to a respective grinding process which is generally separate from the grinding process to which the first and second fractions are subjected, in order to produce a granular plastics material from which the second fraction is substantially absent, and using the granular plastics material by mixing it with the mass of shavings.

34. A system of recycling a mass of waste materials including a first fraction of thermofusible plastics materials and a second fraction of materials which are substantially unaffected by thermofusion processes, comprising:

means for grinding the mass to produce a mass of granular material therefrom, means for compacting the mass of granular material to produce bodies having properties of mechanical cohesion, and means for shaving the bodies to give rise to a mass of shavings of small particle size in which the second fraction is present in the form of a fine powder and/or fibers, the mass of shavings being usable as a filler for addition to plastics materials.

35. A system according to claim 34, including:

means for separating large-sized compounds of plastics material from the mass prior to grinding, further grinding means which are generally separate from the said grinding means, for grinding the large-sized components in order to produce a granular plastics material from which the second plastics material is substantially absent, and means for mixing the granular plastics material with the mass of shavings.

* * * * *